United States Patent [19]

Scott

[11] 4,352,414
[45] Oct. 5, 1982

[54] FRICTION PAD AND SUPPORT FOR A DISC BRAKE

[75] Inventor: James P. Scott, Fort Wayne, Ind.
[73] Assignee: Rockwell International Corporation, Pittsburgh, Pa.
[21] Appl. No.: 212,001
[22] Filed: Dec. 1, 1980
[51] Int. Cl.³ .................... F16D 55/224; F16D 65/02
[52] U.S. Cl. ................................................ 188/73.34
[58] Field of Search ............... 188/18 A, 73.32, 73.33, 188/73.34

[56] References Cited

U.S. PATENT DOCUMENTS 3,942,612  3/1976  Le Marchand et al. ......... 188/73.33
4,034,858  7/1977  Rath .................................. 188/73.34

FOREIGN PATENT DOCUMENTS 2451603  5/1975  Fed. Rep. of Germany ... 188/73.32
1242581  8/1971  United Kingdom ............. 188/73.32

Primary Examiner—Duane A. Reger

[57] ABSTRACT

The invention relates to a friction pad for a disc brake and a disc brake assembly in which the friction pads are slidably supported by tabs extending radially outward of the friction pad backing plates on spaced, axially extending, radially converging edges of an aperture provided to the disc brake caliper. The friction pad includes an abutment surface adjacent each edge of the tab to locate the friction pad relative to an inner surface of the caliper.

7 Claims, 4 Drawing Figures

FRICTION PAD AND SUPPORT FOR A DISC BRAKE

BACKGROUND OF THE INVENTION

1. Field of the Invention

The present invention relates to a disc brake assembly and more specifically to an improved means for supporting friction pads in the disc brake assembly.

The present invention is particularly applicable to a disc brake assembly of the type which includes a rotor or disc mounted for rotation with a vehicle wheel and a floating caliper straddling the periphery of the rotor. The caliper is usually mounted on a support or torque plate by means permitting movement of the caliper in an axial direction relative to the torque plate and rotor. Brake pads are carried by the caliper on opposite sides of the rotor and are movable into contact with oppositely disposed friction braking surfaces of the rotor by means of a suitable actuating mechanism which is usually driven by a fluid motor. In a floating caliper disc brake, each friction pad is located intermediate one leg of the caliper and the adjacent friction surface of the rotor. The actuating mechanism is usually carried by one leg of the caliper and serves to move the friction pad adjacent to that leg axially into contact with the rotor, the reaction force of the contact serving to draw the other leg of the caliper and the other friction pad into contact with the opposite surface of the rotor.

2. Description of the Prior Art

Disc brake pads have been provided with projections or extensions in the form of tabs which serve to mount or support the disc brake pad for sliding movement relative to a caliper. Tabs have been provided at the circumferentially spaced edges of the brake pads to be slidably carried in grooves provided to the caliper. Supporting surfaces in the form of edges have been provided at the ends of brake pads and on tabs or projections provided to the brake pads to be slidably supported by complimentary edges provided to the disc brake caliper. Examples of such arrangements may be found in U.S. Pat. Nos. 3,942,612; 3,972,393 and 4,068,743.

Although various arrangements are known for supporting friction pads within a disc brake assembly, some require additional elements for preventing inadvertent displacement of the friction pads away from their operative position and others require disassembly of parts or retraction of the actuating mechanism to replace the friction pads which may not be readily accomplished in the confines of the vehicle wheel end and in the area where such work is performed. The present invention avoids these problems by providing a disc brake assembly in which the friction pads do not require additional elements for securing the same in operative position and in which the friction pads are readily accessible for inspection or replacement purposes.

SUMMARY OF THE INVENTION

The present invention provides a disc brake for a vehicle comprising a rotor having oppositely disposed friction surfaces, a support including a pair of circumferentially spaced radially extending arms defining a recess therebetween, a slide pin carried by each of said arms and a caliper slidably supported by the slide pins. The caliper includes a bridge straddling the periphery of the rotor and axially spaced depending portions extending radially inward adjacent each friction surface. A pair of friction pads are carried by the caliper with each of the pads extending radially inward adjacent one friction surface of the rotor. Each friction pad is comprised of a backing plate and friction material secured to a part of the backing plate. Each backing plate includes a tab extending from a circumferentially extending edge of the backing plate. An aperture is provided in the caliper bridge and is defined on two sides by circumferentially spaced, axially extending, radially converging edges and includes an access slot extending through at least one of the aperture edges radially outward from the periphery of the rotor. The backing plate tabs are bounded by circumferentially spaced, converging edges mounted for sliding movement along the converging edges of the aperture. The friction pads are thus slidably supported by the backing plate tabs in the aperture to extend radially inward on opposite sides of the rotor and may be readily replaced upon removal of one of the slide pins by rotating the caliper about the other slide pin, thereby withdrawing the friction pads from their operative position adjacent the rotor and permitting the backing plate tabs to be aligned with the access groove and withdrawn from supporting relationship with the aperture edges. The friction pad backing plates are also provided with an abutment surface adjacent each radially converging side of the tab to locate and position the friction pads within the caliper.

The advantages offered by the present invention will become apparent from the following description of the embodiment shown in the accompanying drawings.

DESCRIPTION OF THE DRAWINGS

In the drawings, wherein like reference numerals refer to like parts.

DESCRIPTION OF THE INVENTION

Figure 1:
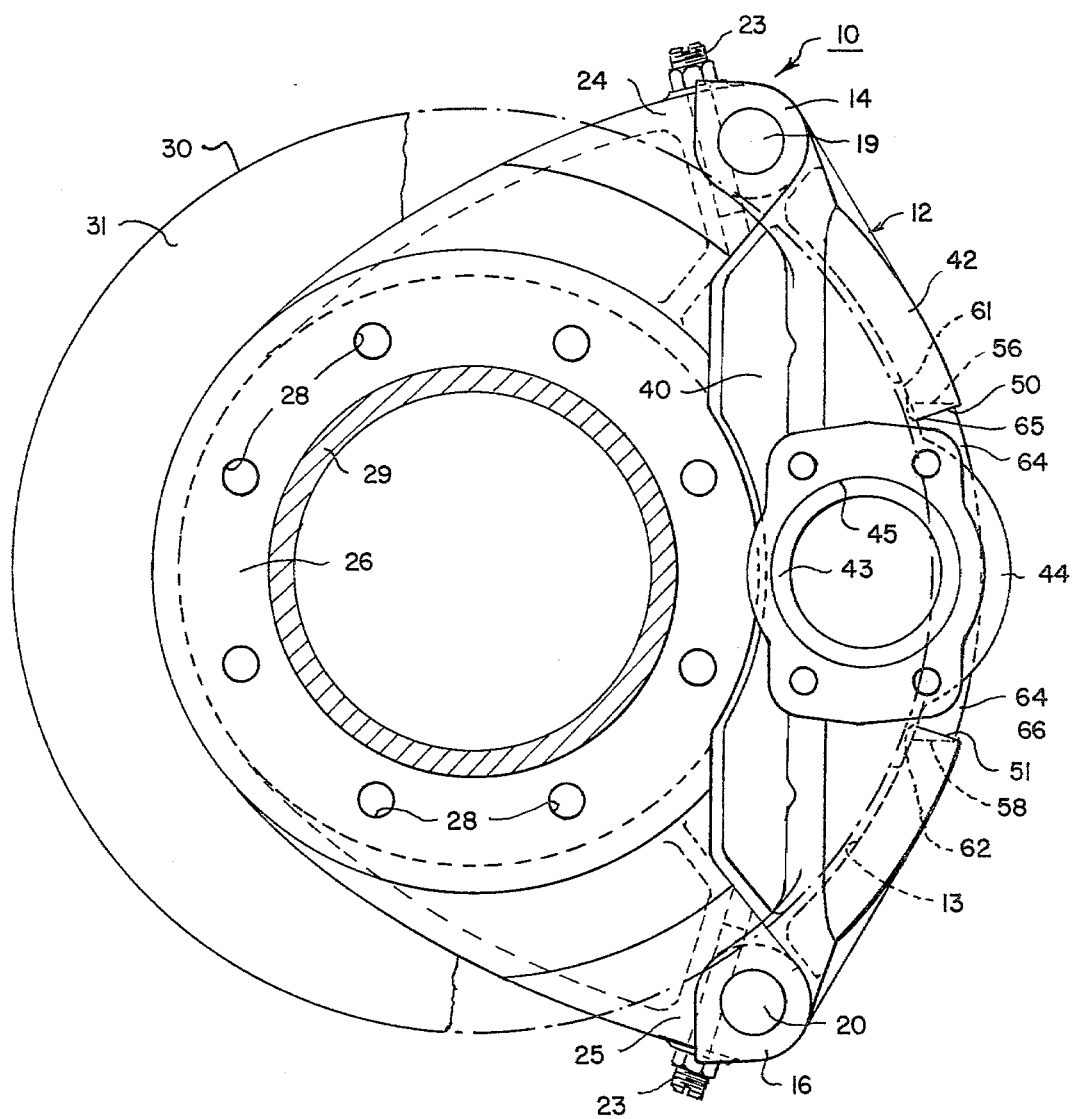
FIG. 1 is a side elevation of a disc brake incorporating the present invention.
Figure 2:
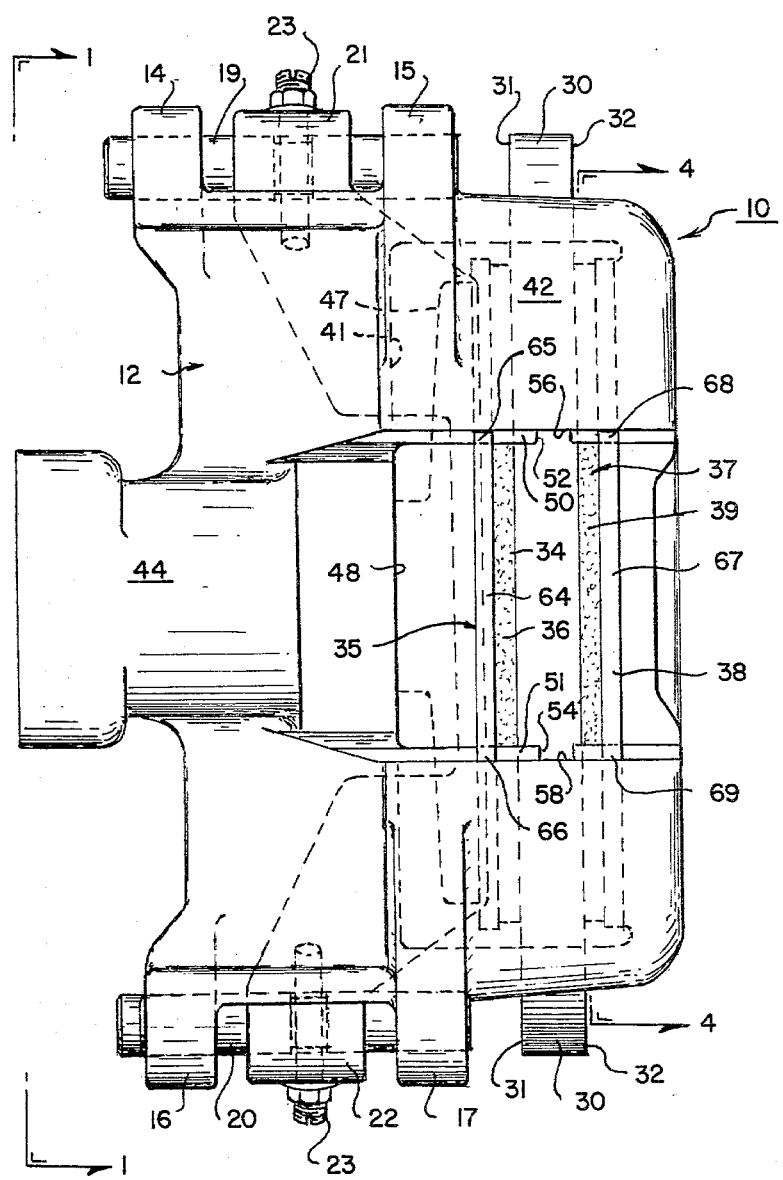
FIG. 2 is a front elevation view of the disc brake assembly of FIG. 1.

With reference to the drawings, FIGS. 1 and 2 show a disc brake assembly generally designated by the numeral 10. The assembly 10 includes a floating caliper 12 mounted by means of circumferentially spaced, axially aligned pairs of bosses 14 and 15, and 16 and 17 on slide pins 19 and 20. The slide pins 19 and 20 are respectively secured by a draw pin 23 within bores provided to bosses 21, 22 at the radially outer extremities of circumferentially spaced, radially extending arms 24, 25 of the brake supporting torque plate or spider 26. The torque plate 26 is provided with a circular array of apertures 28 which receive a plurality of bolts not shown which in turn secure the support or torque plate 26 to a flange welded to a vehicle axle 29. The torque plate 26 could of course be welded directly to the axle 29. A rotor 30 having axially spaced, radially extending, oppositely disposed friction braking surfaces 31 and 32 is secured for rotation with a wheel hub (not shown) carried by the vehicle axle 29 adjacent the disc brake assembly 10.

The caliper 12 is a cast metal component comprised of a depending leg 40 extending radially inward adjacent the friction surface 32 of rotor 30, an oppositely disposed depending leg or wall 41 adjacent the friction surface 31 of rotor 30 and a bridge 42 straddling the periphery of rotor 30 and joining the leg 40 to the wall 41. The wall 41 is formed with a generally cylindrical housing 44 having a bore 45 slidably mounted a piston 43 formed integrally with a load applying plate 47. The contour of the load plate 47 is similar to the contour of the backing plate 35 of the friction pad 34 and moves the pad 34 axially into contact with the rotor friction surface 31 in response to actuation of the brake assembly. The piston 43 and load plate 47 may be moved by suitable hydraulic or mechanical actuating means, not shown. The bridge 42 of caliper 12 is provided with an aperture 46 defined by a radially disposed edge 48 and a pair of circumferentially spaced, axially extending, radially converging edges 50 and 51. The circumferentially spaced edges 50, 51 converge in a radial direction at an included angle of about 32 degrees. The circumferentially spaced edges 50, 51 are each provided with a slot 52, 54. The bottoms 56, 58 of the slots 52, 54 are substantially parallel and the slots 52, 54 are located radially outward from the periphery of the rotor 30 so as to extend at least partly across the periphery of the rotor 30 as best shown by FIG. 2.

Figure 3:
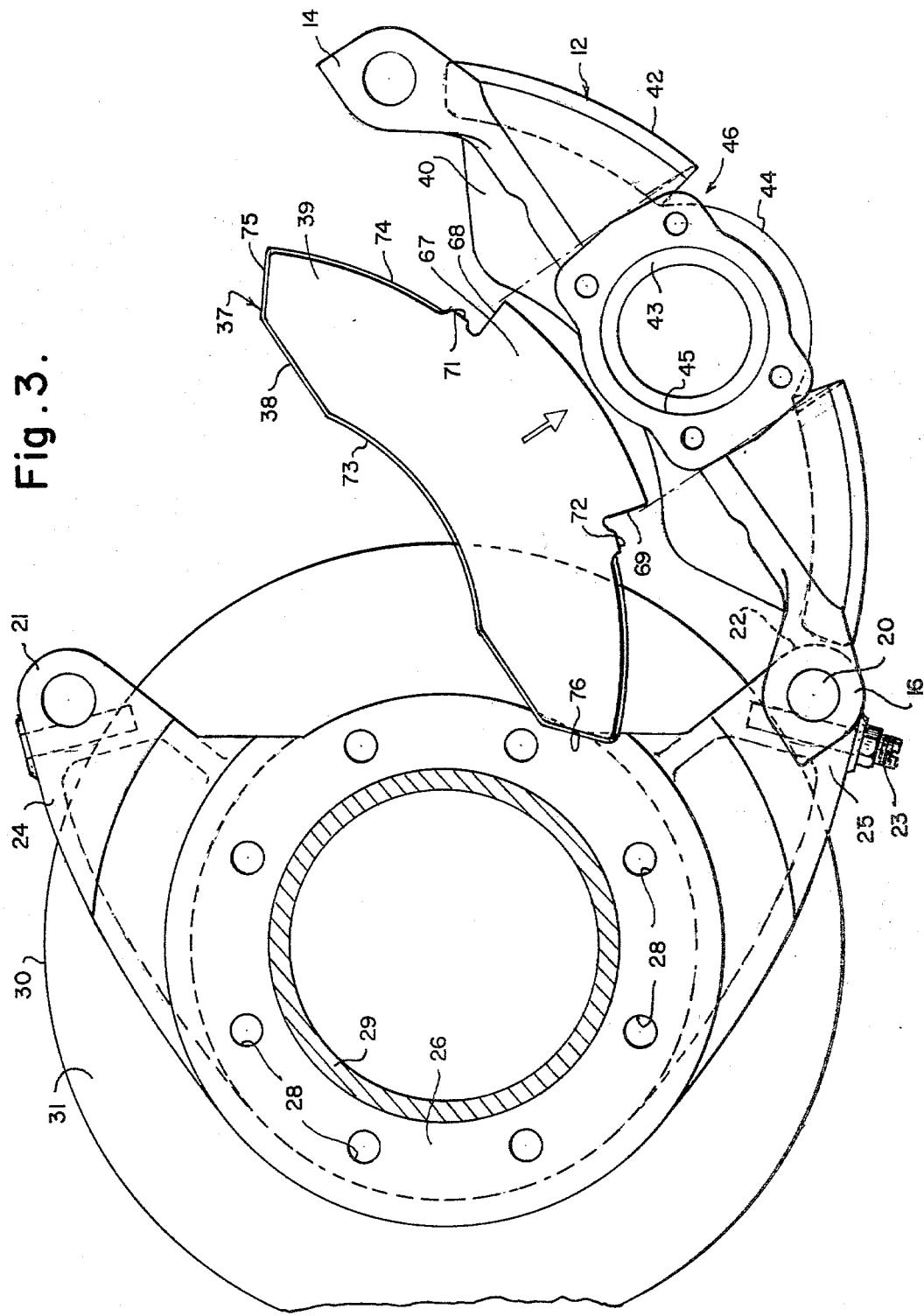
FIG. 3 is a side elevation view of the disc brake assembly of FIG. 1 with the caliper partly removed from the assembly and the brake pad removed from the caliper.
Figure 4:
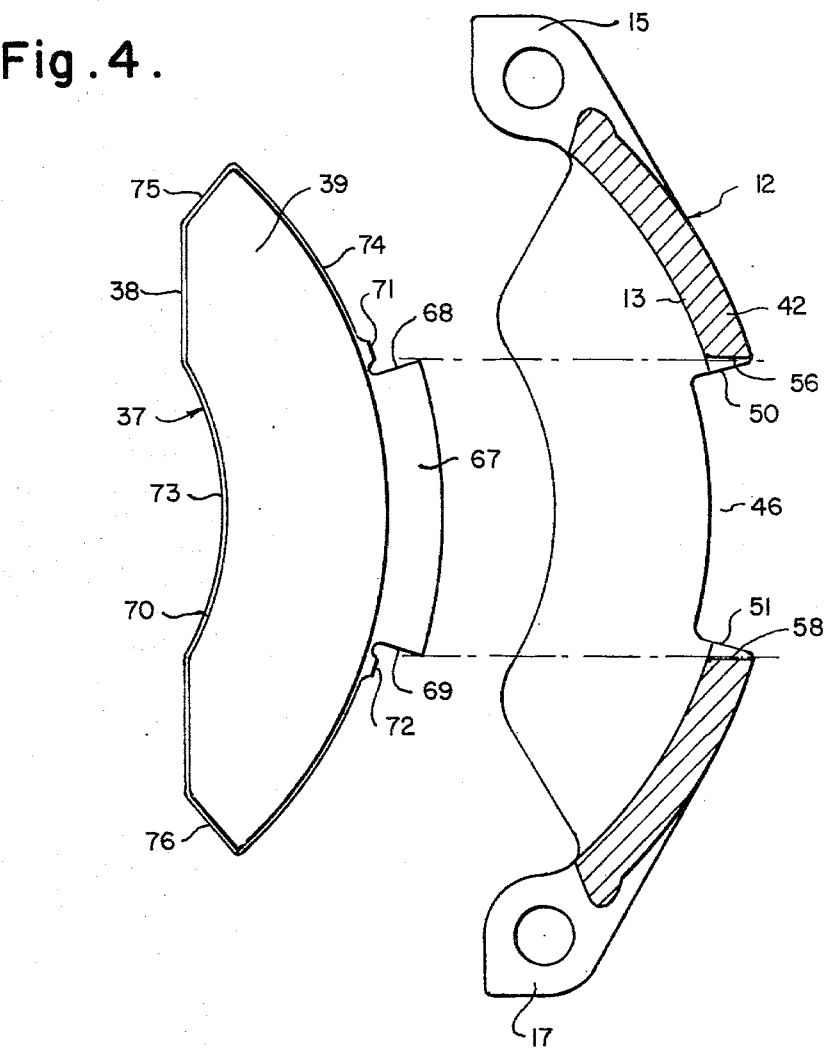
FIG. 4 is a side elevation view of the disc brake caliper partly in section and a friction pad.

Friction pads 34, 37 are respectively comprised of backing plates 35, 38 with friction material 36, 39 secured thereto. The friction pad 37, as best shown by FIGS. 3 and 4, is comprised of a metal backing plate 38 of uniform thickness having friction material 39 secured to a major portion 70 of the backing plate. The major portion 70 is defined by arcuate longitudinal edges 73 and 74 joined by circumferentially spaced lateral edges 75 and 76. The arcuate edge 74 is of greater radius than the edge 73 and extends radially outward to provide a supporting tab 67 of substantial circumferential length less than the distance between the lateral edges 75, 76. The supporting tab 67 is circumferentially bounded by radially converging edges 68 and 69. The backing plate 38 also includes abutment surfaces 71, 72 adjacent the radially converging edges 68 and 69, respectively. The abutment surfaces 71, 72 extend only a short radial distance relative to the length of the radially converging edges 68 and 69. The structure of the metal backing plate 35 of friction pad 34 is identical to the structure of the metal backing plate 38.

The friction pads 34, 37 are axially located between the depending portions 40, 41 of the caliper 12. Friction pad 34 is axially located between the load plate 47 and friction surface 31 of the rotor 30. Friction pad 37 is axially located between the friction surface 32 of rotor 30 and the caliper leg 40. In FIGS. 1 and 2 the friction pads 34, 37 are shown operatively located adjacent the oppositely disposed friction surfaces 31, 32 of rotor 30 with the friction material 36, 39, respectively, facing the surfaces 31, 32.

The friction pads 34, 37 are supported in operative positions between the oppositely disposed friction surfaces of the rotor 30 and the load plate 47 and wall 41 of caliper 12 by means of the radially extending tabs 64 and 67. The friction pad backing plate tabs 64 and 67 are respectively bounded by circumferentially spaced, radially converging edges 65, 66 and 68, 69 which are slidably carried by the circumferentially spaced edges 50, 51 of the caliper aperture 46. The circumferentially spaced edges 65, 66 of friction pad tab 64 and edges 68, 69 of friction pad tab 67 converge at an angle substantially the same as the included angle provided to the radially converging edges 50, 51 of caliper aperture 46 to permit the friction pad tabs 64 and 67 to slide freely along the edges 50 and 51. The abutment surfaces 61, 62 of friction pad backing plate 35 and the abutment surfaces 71, 72 of backing plate 38 abut the radially inner surface 13 of the caliper 12 adjacent the aperture edges 50, 51 to radially locate the friction pads relative to the surface 13. The circumferentially spaced, axially extending, radially converging edges 50, 51 of caliper aperture 46 thus support the tabs 64, 67 of friction pads 34, 37 in their respective operative positions adjacent the oppositely disposed friction surfaces of the rotor 30.

The slots 52, 54 are respectively provided through the circumferentially spaced edges 50, 51 to provide an additional clearance or length which when taken together with the circumferential length of the caliper aperture 46, is adequate to radially inwardly pass the tabs 64, 67, respectively, of friction pads 34, 37 and thereby permit installation and removal of the friction pads 34, 37. The width of the slots 52, 54 is slightly greater than the thickness of the friction pad backing plate tabs 64, 67 and the slots 52, 54 are axially located radially outward of the periphery of the rotor 30 to prevent the backing plate tabs 64, 67 from accidentally or inadvertently becoming aligned with the access slots 52, 54 when the friction pads 34, 37 are respectively in their operative positions adjacent the oppositely disposed friction surfaces 31, 32 of rotor 30.

When necessary, the friction pads 34, 37 may be readily installed or withdrawn as shown by FIGS. 3 and 4. In FIG. 3, the draw key 23 securing slide pin 19 has been withdrawn permitting removal of the slide pin 19 and pivotal movement of the caliper 12 about the slide pin 20 radially outwardly of the rotor 30. This movement of the caliper 12 withdraws the friction pads 34, 37 from their operative position adjacent the friction surfaces 31, 32 of the rotor and enables the backing plate tabs 64, 67 to be slid axially along the supporting aperture edge surfaces 50, 51 into alignment with the access slots 52, 54, thereby permitting radial withdrawal of the friction pads 34, 37 from their supporting relationship with the floating caliper 12. Replacement friction pads may be installed in reverse manner. The tabs of the replacement friction pads are aligned with the access slots 52, 54 and inserted into the caliper aperture 46 where the tabs are axially displaced into supporting relationship on the aperture edges 50, 51 and spaced apart to permit the friction lining material to move across the oppositely disposed friction surfaces of the rotor. The caliper 12 is then pivoted back to align the bores of caliper bosses 14 and 15 with the bore provided to the boss 21 of torque plate arm 24. The slide pin 19 is then replaced in the axially aligned bores of bosses 14, 15 and 21 and locked in position by draw key 23.

The present invention thus provides a simple economical means for slidably mounting the friction pads to the caliper which also prevents accidental removal of the friction pads from their operative relationship between the caliper legs and the rotor and permits ease of assembly and disassembly without the necessity of additional parts for either securing the friction pads to the caliper or guarding against their accidental or inadvertant removal from the disc brake assembly.

The invention may also be embodied in order specific forms without departing from the spirit or essential characteristics thereof. The foregoing description is therefore to be considered as illustrative and not restrictive, the scope of the invention being defined by the appended claims and all changes which come within the meaning and range of equivalency of the claims are therefore intended to be embraced thereby.

I claim:

1. In a disc brake, a rotor having oppositely disposed friction surfaces, a caliper including a leg extending radially inward adjacent a friction surface of said rotor, a wall extending radially inward adjacent the other friction surface of said rotor and a bridge straddling the periphery of said rotor and joining said leg and said wall, load applying means carried by said wall, a friction pad intermediate said leg of said caliper and said adjacent friction surface of said rotor, a friction pad intermediate said load applying means and said other friction surface of said rotor, each said friction pad comprising a backing plate and friction material secured to part of said backing plate, each said backing plate being defined by circumferentially spaced lateral edges and having a tab of substantial circumferential length less than the distance between said lateral edges extending radially therefrom, means mounting said friction pads to said caliper comprising an aperture in said bridge defined on two sides by circumferentially spaced, axially extending, radially converging edges, said radially extending tabs being bounded by circumferentially-spaced converging edges slidably carried by said aperture edges and an access slot extending radially through at least one of said aperture edges the circumferential length of said access slot and said aperture together being adequate to radially pass the tab of said brake pad backing plate to permit installation and removal thereof.

2. The vehicle disc brake defined by claim 1 including an access slot extending radially through each of said circumferentially spaced edges of said aperture each said access slot being aligned with the other access slot.

3. The vehicle disc brake defined by claim 2 wherein the bottoms of said access slots are parallel.

4. The vehicle disc brake defined by claim 2 wherein said access slots are located radially outward from the periphery of said rotor.

5. A disc brake comprising a rotor having oppositely disposed friction surfaces, a support including a pair of circumferentially spaced, radially extending arms defining a recess therebetween, a slide pin carried by each of said arms, a caliper slidably supported within said recess by said slide pins, said caliper including a bridge straddling the periphery of said rotor and axially spaced depending portions extending radially inward adjacent each said friction surface, a pair of friction pads carried by said caliper with each of said pads extending radially inward adjacent one friction surface of said rotor, each said friction pad comprising a backing plate and friction material secured to a part of said backing plate, each said backing plate including a tab extending from a circumferentially extending edge of said backing plate, an aperture in said caliper bridge, said aperture being defined on two sides by circumferentially spaced, axially extending, radially converging edges, said backing plate tabs being bounded by circumferentially spaced converging edges slidably along said converging edges of said aperture and an access slot extending through at least one of said aperture edges radially outward from the periphery of said rotor whereby said friction pads are slidably supported adjacent opposite sides of said rotor by said backing plate tabs in said aperture and may be readily replaced upon removal of one of said slide pins by rotating said caliper about the other slide pin thereby withdrawing said friction pads from their operative position adjacent said rotor and permitting the backing plate tabs to be aligned with said access groove and withdrawn from supporting relationship with said aperture edges.

6. A friction pad for a disc brake comprising a backing plate having a major portion defined by arcuate longitudinal edges of different radii of curvature jointed by spaced lateral edges, friction material secured to one side of said major portion of said backing plate and a supporting portion of said backing plate comprising a tab of substantial circumferential length less than the distance between said lateral edges extending radially from the longitudinal edge of greater radii and circumferentially bounded by radially converging edges.

7. The friction pad defined by claim 6 wherein said backing plate includes an abutment surface adjacent each radially converging edge of said tab, each said abutment surface extending a relatively short radial distance relative to the length of said radially converging edges.

* * * * *